(12) United States Patent
Yamada et al.

(10) Patent No.: US 11,143,518 B2
(45) Date of Patent: Oct. 12, 2021

(54) DESTINATION EXTRAPOLATION DEVICE

(71) Applicant: NTT DOCOMO, INC., Chiyoda-ku (JP)

(72) Inventors: Naoharu Yamada, Chiyoda-ku (JP); Masahiro Inoue, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 367 days.

(21) Appl. No.: 16/462,854

(22) PCT Filed: Jul. 6, 2018

(86) PCT No.: PCT/JP2018/025729
§ 371 (c)(1),
(2) Date: May 21, 2019

(87) PCT Pub. No.: WO2019/009414
PCT Pub. Date: Jan. 10, 2019

(65) Prior Publication Data
US 2021/0285776 A1  Sep. 16, 2021

(30) Foreign Application Priority Data
Jul. 7, 2017 (JP) .............................. JP2017-133918

(51) Int. Cl.
*G01C 21/34* (2006.01)
(52) U.S. Cl.
CPC ................................ *G01C 21/3415* (2013.01)
(58) Field of Classification Search
CPC ........................ G01C 21/3415; G08G 1/0968
See application file for complete search history.

(56) References Cited

U.S. PATENT DOCUMENTS 9,207,092 B1 * 12/2015 Yamasaki ............. G06F 21/629
2018/0018635 A1 * 1/2018 Suzuki ............... G06Q 10/1093

FOREIGN PATENT DOCUMENTS

| JP | 2010-160779 A | 7/2010 |
| JP | 2011-164070 A | 8/2011 |
| JP | 2016-38297 A | 3/2016 |

OTHER PUBLICATIONS

International Search Report dated Sep. 18, 2018 in PCT/JP2018/025729 filed Jul. 6, 2018.

(Continued)

*Primary Examiner* — Marthe Y Marc-Coleman
(74) *Attorney, Agent, or Firm* — Oblon, McClelland, Maier & Neustadt, L.L.P.

(57) ABSTRACT

To estimate a more useful destination for users. A destination estimation apparatus 1 comprises a travel route history registration unit 13 storing a positional information history as a history of positional information of a user, a positional information acquisition unit 10 acquiring the positional information of the user, and a destination estimation unit 15 estimating a destination of the user by taking a location indicated by the acquired positional information as a start point based on the stored positional information history. The destination estimation unit 15 calculates a reaching level as a degree the user is reaching the estimated destination based on the stored positional information history, and re-estimates a new destination by taking the estimated destination as a start point when the calculated reaching level is equal to or more than a prescribed threshold value.

4 Claims, 7 Drawing Sheets

(56) References Cited

OTHER PUBLICATIONS

English translation of the International Preliminary Report on Patentability and Written Opinion of the International Searching Authority dated Jan. 16, 2020 in PCT/JP2018/025729, 6 pages.

* cited by examiner

| START POINT | THROUGH POINT | ARRIVAL POINT |
|---|---|---|
| (35.34321, 139.5471, 28, 2009/8/24 12:00) | (335.34350, 139.5493, 203, 2009/8/24 12:05) (35.34402, 139.5501, 112, 2009/8/24 12:10) ...... | (35.35132, 139.5609, 154, 2009/8/24 13:15) |

Fig.4

| ROUTE ID | START POINT | THROUGH POINT | ARRIVAL POINT | NUMBER OF TRAVELING TIME |
|---|---|---|---|---|
| 1 | (35.34330, 139.5480, 49, 2009/8/24 12:00) | (35.34351, 139.5460, 10, 2009/8/24 12:05) (35.34433, 139.5480, 201, 2009/8/24 12:10) ...... | (35.35101, 139.5687, 21, 2009/8/24 13:15) | 5 |
| 2 | (35.35138, 139.5630, 10, 2009/8/24 14:30) | (35.35209, 139.5590, 98, 2009/8/24 14:35) (35.35321, 139.5403, 150, 2009/8/24 14:40) ...... | (35.36876, 139.5043, 208, 2009/8/24 16:45) | 3 |
| .... | .... | .... | .... | .... |

DESTINATION EXTRAPOLATION DEVICE

TECHNICAL FIELD

The present invention relates to a destination estimation apparatus configured to estimate destinations of users.

BACKGROUND ART

Following Patent Literature 1 discloses a destination prediction apparatus configured to predict destinations of mobile bodies such as automobiles.

CITATION LIST

Patent Literature

Patent Literature 1: Japanese Unexamined Patent Publication No. 2016-038297

SUMMARY OF INVENTION

Technical Problem

With the above-mentioned destination prediction apparatus, there are cases where user's home is predicted as the destination when the user is returning home at night by an automobile, for example. However, it is natural for the user that the destination is the user's home since the user is returning home. That is, it is not possible to estimate a useful destination for the user.

In order to overcome such circumstance, it is an object to provide a destination prediction apparatus capable of estimating more useful destinations for the users.

Solution to Problem

In order to overcome such shortcomings, a destination estimation apparatus according to an aspect of the present invention comprises: a storage unit storing a positional information history as a history of positional information of a user; an acquisition unit acquiring the positional information of the user; and an estimation unit estimating, based on the positional information history stored by the storage unit, a destination of the user by taking a location indicated by the positional information acquired by the acquisition unit as a start point, wherein the estimation unit calculates a reaching level as a degree the user is reaching an estimated destination, and re-estimates a new destination by taking the estimated destination as a start point when a calculated reaching level is equal to or more than a prescribed threshold value.

With such destination estimation apparatus, when the reaching level of the estimated destination is calculated and the calculated reaching level is equal to or more than the prescribed threshold value, a new destination taking the estimated destination as a start point is re-estimated. For example, in a case where the user's home is estimated as the arrival point when the user is going home at night and the traveling probability to the user's home is equal to or more than the prescribed threshold value, a new arrival point taking the user's home as the start point is re-estimated. The re-estimated new arrival point is useful for the user since the new arrival point can be a candidate for the destination the user goes the next day, for example. That is, it is possible to estimate the destination more useful for the user.

Advantageous Effects of Invention

It is possible to estimate more useful destinations for the users.

DESCRIPTION OF EMBODIMENTS

Hereinafter, a preferred embodiment of the destination estimation apparatus will be described in details by referring to the accompanying drawings. Same reference signs are applied to same elements in explanations of the drawings, and duplicated explanations are omitted. Further, it is to be noted that the preferred embodiments in the explanations hereinafter are merely specific examples of the present invention and the present invention is not limited to such preferred embodiments unless there is any such indication of limiting in the present invention.

Figure 1:
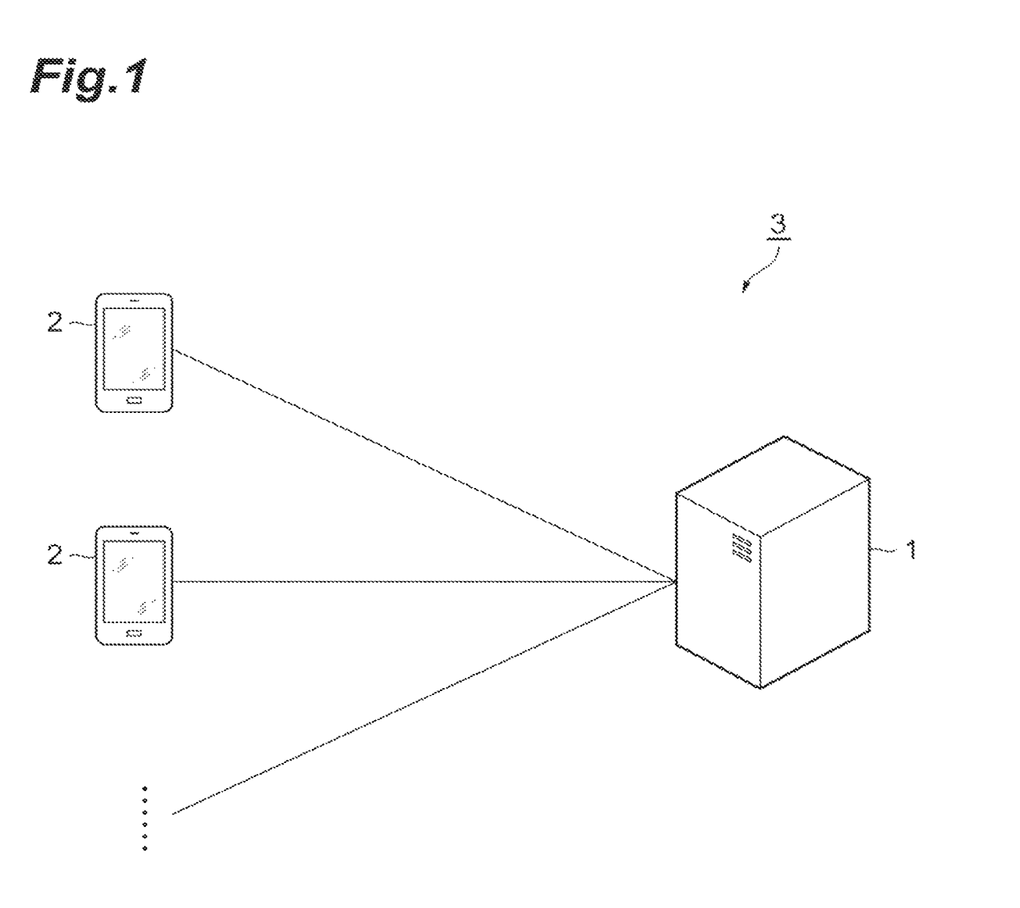
FIG. 1 shows a system block diagram of a destination estimation system according to an embodiment of the present invention.

FIG. 1 is a system block diagram of a destination estimation system 3 according to the embodiment of the present invention. As shown in FIG. 1, the destination estimation system 3 is configured with a destination estimation apparatus 1 (destination estimation apparatus) and one or more mobile terminal 2. Note that a plurality of mobile terminals 2 are also written as "mobile terminal 2" hereinafter. The destination estimation apparatus 1 and each mobile terminal 2 are connected mutually via a network such as the Internet or a radio network, and capable of transmitting and receiving information mutually.

The destination estimation apparatus 1 is a computer device such as a server device. The destination estimation apparatus 1 estimates a destination of a user (or the mobile terminal 2 itself; this also applies hereinafter) of the mobile terminal 2. A destination is information (e.g., positional information of traveling destination) regarding a traveling destination the user of the mobile terminal 2 is planning to stay after traveling made thereinafter. The destination estimation apparatus 1 may output an estimated destination to the user of the mobile terminal 2.

The mobile terminal 2 is a computer device such as a smartphone, a notebook PC (Personal Computer), or the like. The user of the mobile terminal 2 carries the mobile terminal 2. The mobile terminal 2 includes a GPS (Global Positioning System) and is capable of acquiring current positional information of the user of the mobile terminal 2 by the GPS. The positional information includes latitude, longitude, positioning error, positioning time (acquisition time at which the latitude and longitude are acquired), and the like. In the present embodiment, the positional information acquired by the GPS is used for explanations. However, the positional information is not limited to such information. Positional information acquired based on base station information transmitted from a base station, for example, may be used as well.

Figure 2:
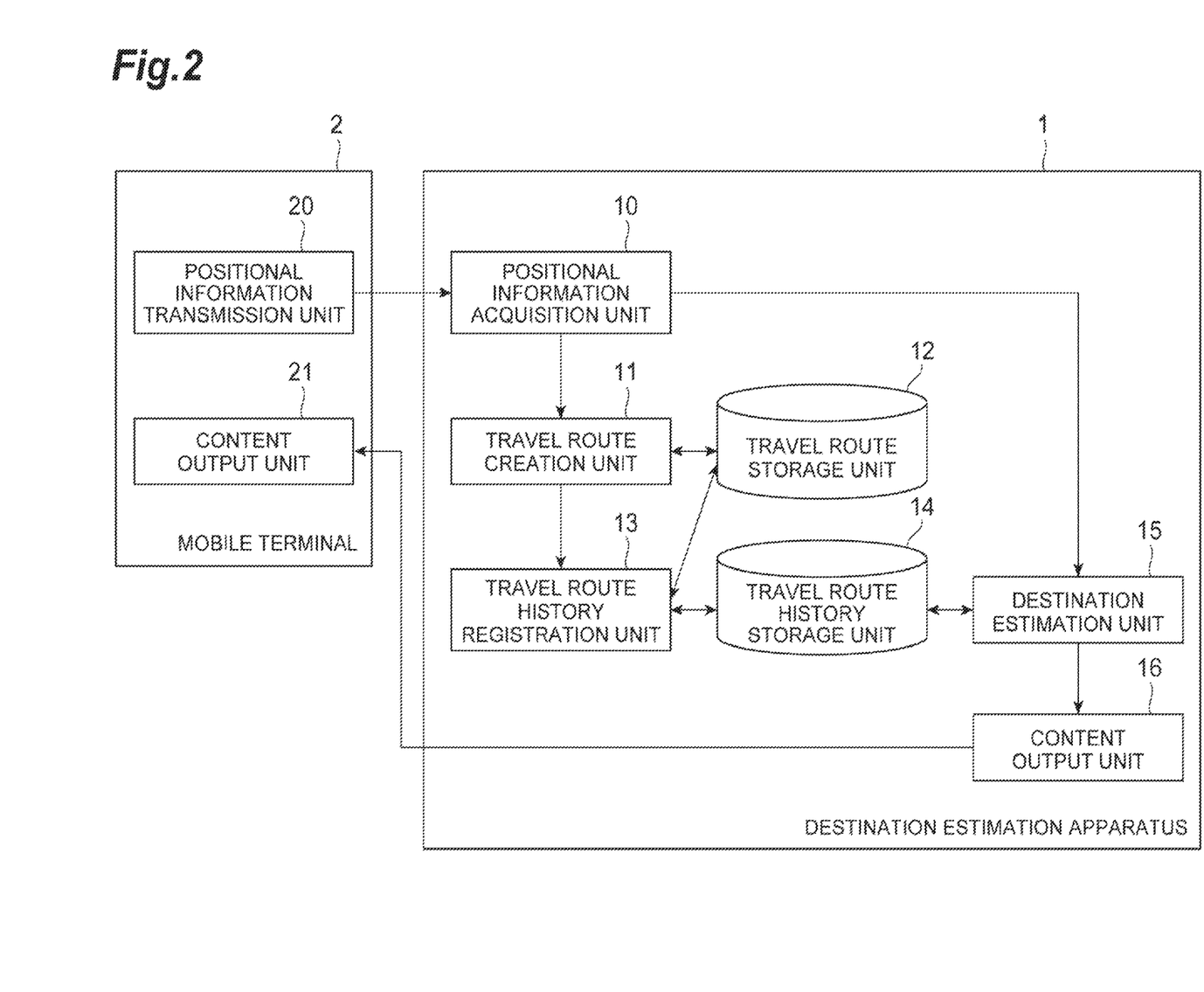
FIG. 2 shows a functional block diagram of a destination estimation apparatus and a mobile terminal according to the embodiment of the present invention.

FIG. 2 is a functional block diagram of the destination estimation apparatus 1 and the mobile terminal 2. As shown in FIG. 2, the destination estimation apparatus 1 is configured by including a positional information acquisition unit 10 (acquisition unit), a travel route creation unit 11, a travel route storage unit 12, a travel route history registration unit 13, a travel route history storage unit 14 (storage unit), a destination estimation unit 15 (estimation unit), and a content output unit 16. Meanwhile, the mobile terminal 2 is configured by including a positional information transmission unit 20 and a content output unit 21.

First, each functional block of the mobile terminal 2 shown in FIG. 2 will be described.

The positional information transmission unit 20 transmits, to the destination estimation apparatus 1, current positional information of the user of the mobile terminal 2 acquired by the GPS provided to the mobile terminal 2. The positional information transmission unit 20 also transmits a user ID for identifying the user of the mobile terminal 2 to the destination estimation apparatus 1. It is assumed that address information (IP address or the like) of the destination estimation apparatus 1 used when transmitting is set in advance in the destination estimation apparatus 1. Timing for transmission may be periodical (e.g., every 30 seconds), may be timing designated by the user, or may be timing set by the destination estimation apparatus 1 for the mobile terminal 2 via the network.

The content output unit 21 outputs content transmitted from the destination estimation apparatus 1. Specifically, the content output unit 21 displays the content transmitted from the destination estimation apparatus 1 on a display device provided to the mobile terminal 2. The user of the mobile terminal 2 can view the content displayed by the content output unit 21. Note that the content output unit 21 may voice-output the content transmitted from the destination estimation apparatus 1 via a speaker provided to the mobile terminal 2 or may transmit to other devices via the network.

Subsequently, each functional block of the destination estimation apparatus 1 shown in FIG. 2 will be described.

The positional information acquisition unit 10 acquires positional information (including positioning time) of the user of the mobile terminal 2. Specifically, the positional information acquisition unit 10 acquires the positional information of the user of the mobile terminal 2 transmitted from the mobile terminal 2. Further, the positional information acquisition unit 10 may acquire the positional information of the user of the mobile terminal 2 stored in advance in the destination estimation apparatus 1. The timing the positional information acquisition unit 10 acquires the positional information of the user of the mobile terminal 2 may be timing the positional information is transmitted from the mobile terminal 2, may be periodical (e.g., every 30 seconds), may be timing designated by the user, or may be timing set in advance in the destination estimation apparatus 1. The positional information acquisition unit 10 outputs the acquired positional information of the user of the mobile terminal 2 to the travel route creation unit 11 and the destination estimation unit 15.

When acquiring the positional information of the user of the mobile terminal 2, the positional information acquisition unit 10 also acquires the user ID for identifying the user of the mobile terminal 2 from the mobile terminal 2 or the destination estimation apparatus 1. The destination estimation apparatus 1 uses the user ID acquired by the positional information acquisition unit 10 and processes, by associating with the user ID, the positional information acquired by the positional information acquisition unit 10 as well as the information and the like generated based on the positional information. Thereby, generated information and executed processing in the destination estimation apparatus 1 can be associated with the user of the mobile terminal 2. While explanations regarding associating with the user ID are omitted in the explanations hereinafter, it is to be noted that each processing and the like of the destination estimation apparatus 1 are executed by each user of the mobile terminal 2.

The travel route creation unit 11 creates travel route information based on the positional information of the user of the mobile terminal 2 inputted from the positional information acquisition unit 10. The travel route information is information indicating a route (course) travelled by the user of the mobile terminal 2. The travel route information is configured by including a start point, zero or more through point, and an arrival point. The start point is information regarding the point the user of the mobile terminal 2 departed (e.g., positional information of that point). "Point" in the present embodiment may be a point indicated by the latitude and the longitude or an area including a prescribed region from the point. The through point is information regarding the point the user of the mobile terminal 2 passed through (without staying) between the start point and the arrival point (e.g., positional information regarding that point). The arrival point is the point the user of the mobile terminal 2 stayed for the first time after departing from the start point, i.e., the arrived point (or positional information of that point). Staying indicates to remain for a prescribed time at a prescribed point or in an area including a prescribed region from the prescribed point. Travel route information creation processing executed by the travel route creation unit 11 will be described later. When completing creation of the travel route information (at least registering the start point and the arrival point), the travel route creation unit 11 outputs the created travel route information to the travel route storage unit 12 and outputs information indicating completion of the creation to the travel route history registration unit 13.

Figure 3:
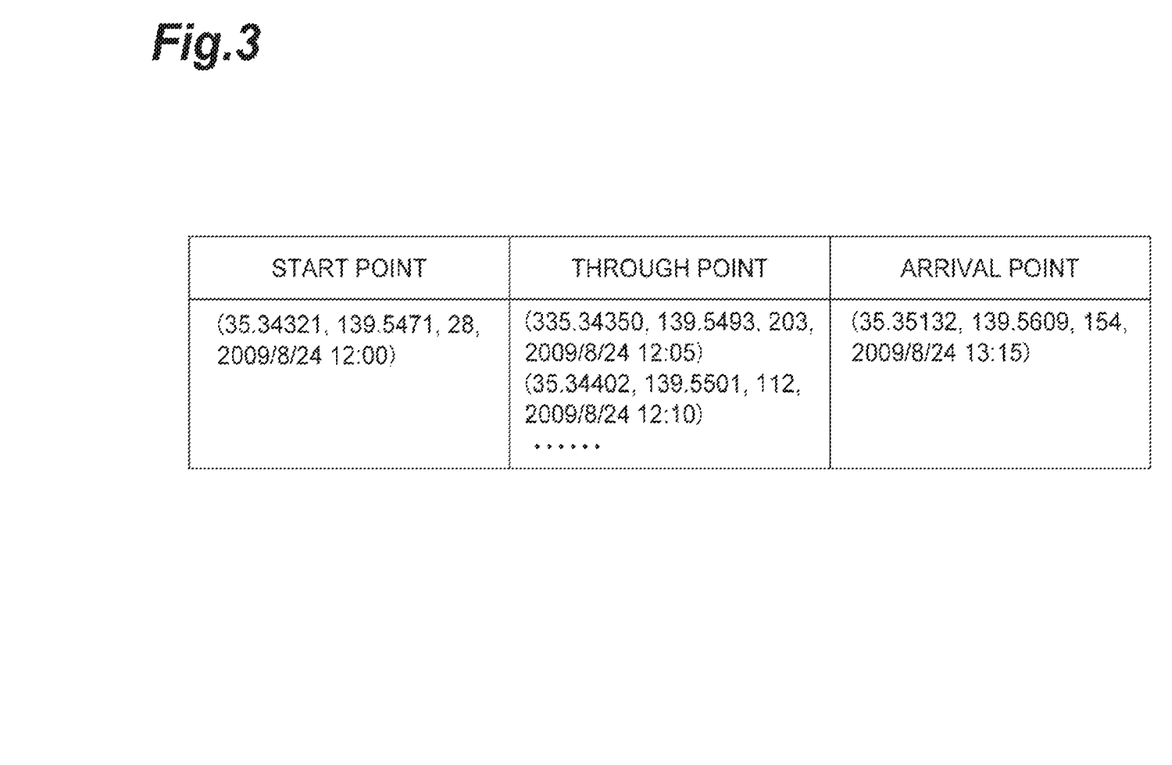
FIG. 3 shows a chart showing an example of a table of a travel route.

The travel route storage unit 12 (temporarily) stores travel route information inputted from the travel route creation unit 11 and created by the travel route creation unit 11. FIG. 3 is a chart showing an example of a table of the travel route information created by the travel route creation unit 11 and stored by the travel route storage unit 12. In the example of the table shown in FIG. 3, the travel route information includes a start point configured with a set of positional information, through points configured with a plurality of sets of positional information, and an arrival point configured with a set of positional information. For example, the start point is configured with the positional information, and "35.34321" denotes the latitude, "139.5471" denotes the longitude, "28" denotes a positioning error (unit is meter), and "2009/8/24 12:00" denotes the positioning time. The travel route storage unit 12 stores at most one set of travel route information for each user of the mobile terminal 2. When the travel route information stored in the travel route storage unit 12 is registered by the travel route registration unit 13 to be described later, the travel route information is deleted from the travel route storage unit 12.

The travel route registration unit 13 registers the travel route information created by the travel route creation unit 11 to a travel route history that is the history of the travel route information. Specifically, when the information indicating that creation of the travel route information is completed is inputted from the travel route creation unit 11, the travel route history registration unit 13 acquires the travel route information stored by the travel route storage unit 12 and registers the acquired travel route information to the travel route history stored by the travel route history storage unit 14. The registration processing of the travel route history executed by the travel route history registration unit 13 will be described later.

Figure 4:
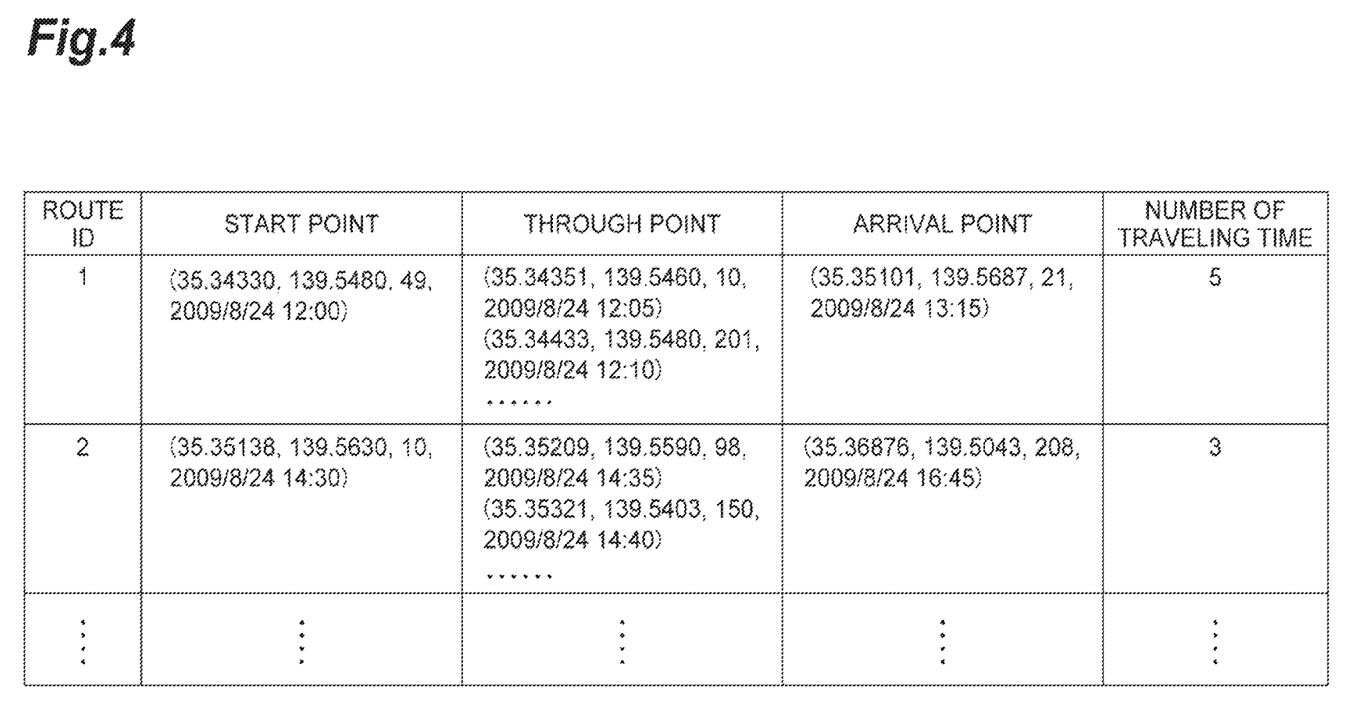
FIG. 4 shows a chart showing an example of a table of a travel route history.

The travel route history storage unit 14 stores the travel route history (positional information history) that is the history of the positional information of the user. More specifically, the travel route history is configured by including the travel route information. FIG. 4 is a chart showing an example of a table of the travel route history stored by the travel route history storage unit 14. As in the example of the table shown in FIG. 4, each record (row) shows a set of travel route, and a route ID for identifying each travel route is applied in an associated manner. Further, information in a column of start point, in a column of through point, and in a column of arrival point is information based on the start point, the through point, and the arrival point of the travel route information, respectively. A column of the number of traveling times shows a value how many times the user of the mobile terminal 2 travelled (passed through) in the past.

The destination estimation unit 15 estimates the destination of the user taking the position indicated by the positional information acquired by the positional information acquisition unit 10 as the start point based on the travel route history stored by the travel route history storage unit 14. More specifically, when the positional information of the user of the mobile terminal 2 is inputted from the positional information acquisition unit 10, the destination estimation unit 15 estimates the destination of the user taking the position indicated by the inputted positional information as the start point based on the travel route history stored by the travel route history storage unit 14. Timing for inputting the positional information to the destination estimation unit 15 from the positional information acquisition unit 10 may be periodical (e.g., every 1 hour), may be timing set in advance in the destination estimation apparatus 1, or may be timing designated by the user of the mobile terminal 2 for the destination estimation apparatus 1 via the network.

The destination estimation unit 15 further calculates a reaching level that is a degree the user has reached the estimated destination based on the travel route history stored by the travel route history storage unit 14 and, when the calculated reaching level is equal to or more than a prescribed threshold value, re-estimates a new destination by taking the estimated destination as the start point. Details of processing of the destination estimation unit 15 will be described later. The destination estimation unit 15 outputs the estimated destination to the content output unit 16.

The content output unit 16 acquires content based on the destination inputted from the destination estimation unit 15, and outputs to the mobile terminal 2 (source of the positional information inputted to the destination estimation unit 15). For example, the destination estimation apparatus 1 includes a content storage unit (not shown) for storing associating information regarding association of the destination with the content set in advance. The content output unit 16 acquires the content associated with the destination inputted from the destination estimation unit 15 in the associating information and outputs the acquired content to the mobile terminal 2. Examples of the content may be information regarding weather, disasters, traffic jam forecast, or traffic restrictions near the point indicated by the destination.

Described heretofore are the explanations regarding each of the functional blocks of the destination estimation apparatus 1.

Figure 5:
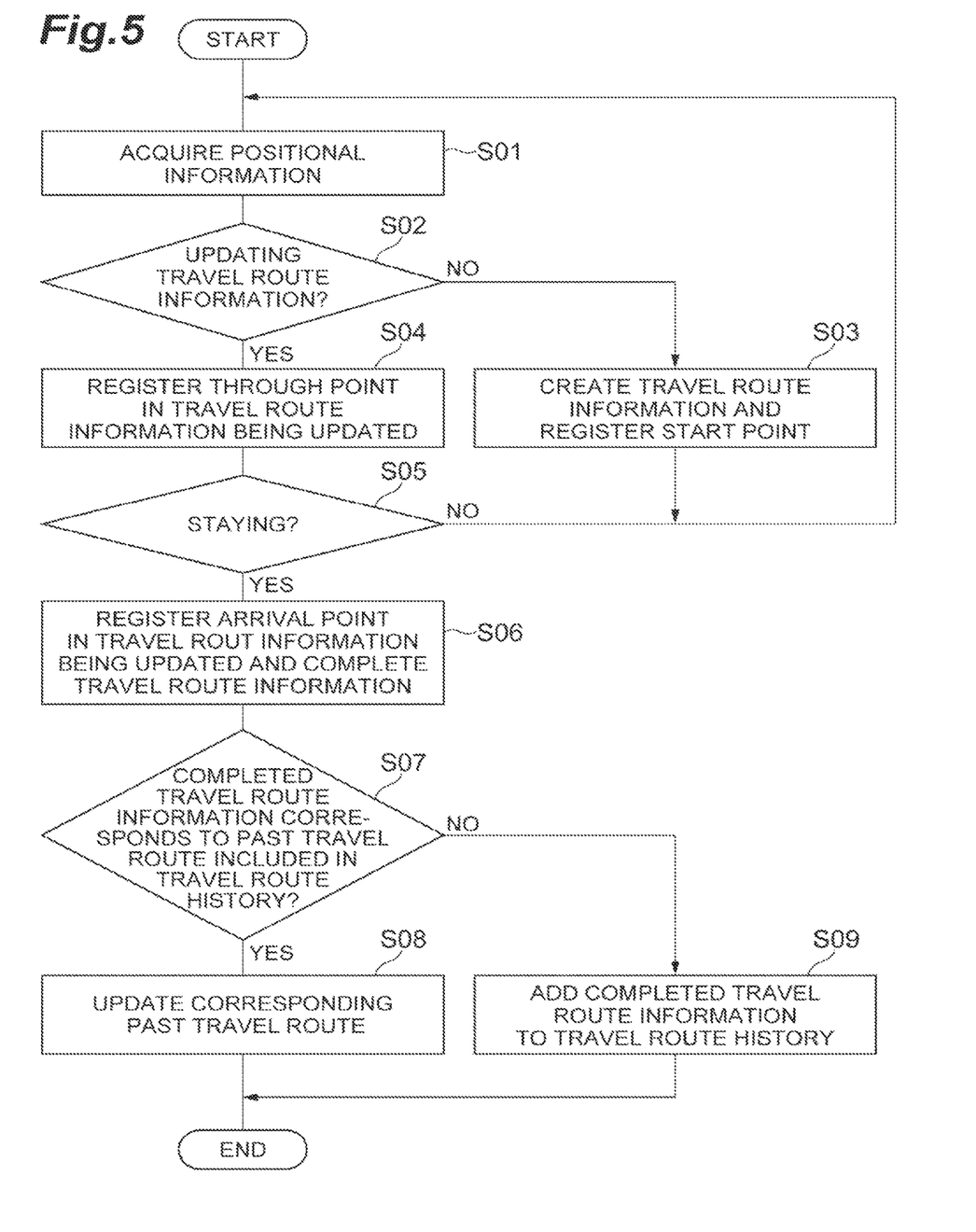
FIG. 5 shows a flowchart showing registration processing of the travel route history.

Subsequently, creation processing of the travel route information and registration processing of the travel route history executed by the destination estimation apparatus 1 will be described by using the flowchart shown in FIG. 5.

First, the positional information is acquired by the positional information acquisition unit 10 (step S01). Then, it is judged by the travel route creation unit 11 whether or not the travel route information is currently updated (step S02). Specifically, the travel route creation unit 11 judges whether or not the travel route information (being updated) is stored by the travel route storage unit 12, and judges as updated when stored while judging as not updated when not stored. When judged as not updated in S02 (S02: NO), new travel route information is created by the travel route creation unit 11, the positional information acquired in S01 is registered as the start point of the created travel route information, and the created travel route information is stored by the travel route storage unit 12 (step S03). After S03, the processing is returned to S01. In the meantime, when judged as updated in S02 (S02: YES), subsequently the positional information acquired in S01 as a through point of the travel route information stored by the travel route storage unit 12 is registered by the travel route creation unit 11 (step S04).

Subsequently to S04, it is judged by the travel route creation unit 11 whether or not the user of the mobile terminal 2 is staying (step S05). Specifically, the travel route creation unit 11 acquires the positional information registered as the through point out of the travel route information stored by the travel route storage unit 12, judges whether or not the user has been remaining within a 100-meter radius for 30 minutes or more from the positioning time of the positional information acquired in S01, for example, based on the acquired positional information and the positional information acquired in S01, and judges as staying when remained while judging as not staying when not remained. When judged as not staying in S05 (S05: NO), the processing is returned to S01. In the meantime, when judged as staying in S05 (S05: YES), subsequently the positional information acquired in S01 as the arrival point of the travel route information stored by the travel route storage unit 12 is registered by the travel route creation unit 11, thereby completing the travel route information (step S06). The above processing of S01 to S06 is the creation processing of the travel route information executed by the destination estimation apparatus 1.

Subsequently to S06, the travel route history registration unit 13 judges whether or not the travel route information completed in S06 corresponds to (same as) the travel route of the past included in the travel route history stored by the travel route history storage unit 14 (step S07). For such judgment, judging methods utilizing minimum rectangular region as existing techniques disclosed in following Patent Literatures 2 and 3 are used. When judged as corresponding in S07 (S07: YES), the travel route history registration unit 13 updates the travel route information of the past judged as corresponding and included in the travel route history stored by the travel route history storage unit 14 (step S08). For example, in S08, the travel route history registration unit 13 adds "1" to the value in the column of the number of traveling times of the travel route information of the past.

Other than that, in S08, the travel route history registration unit 13 may use update methods disclosed in the following Patent Literatures 2 and 3. In the meantime, when judged as not corresponding in S07 (S07: NO), the travel route history registration unit 13 additionally registers the travel route information completed in S06 to the travel route history stored by the travel route history storage unit 14 (step S09). At that time, "1" is set as a value in the column of the number of traveling times of the added travel route information. The above processing of S07 to S09 is the registration processing of the travel route history executed by the destination estimation apparatus 1.

Patent Literature 2: Japanese Unexamined Patent Publication No. 2010-160779

Patent Literature 3: Japanese Unexamined Patent Publication No. 2011-164070

Figure 6:
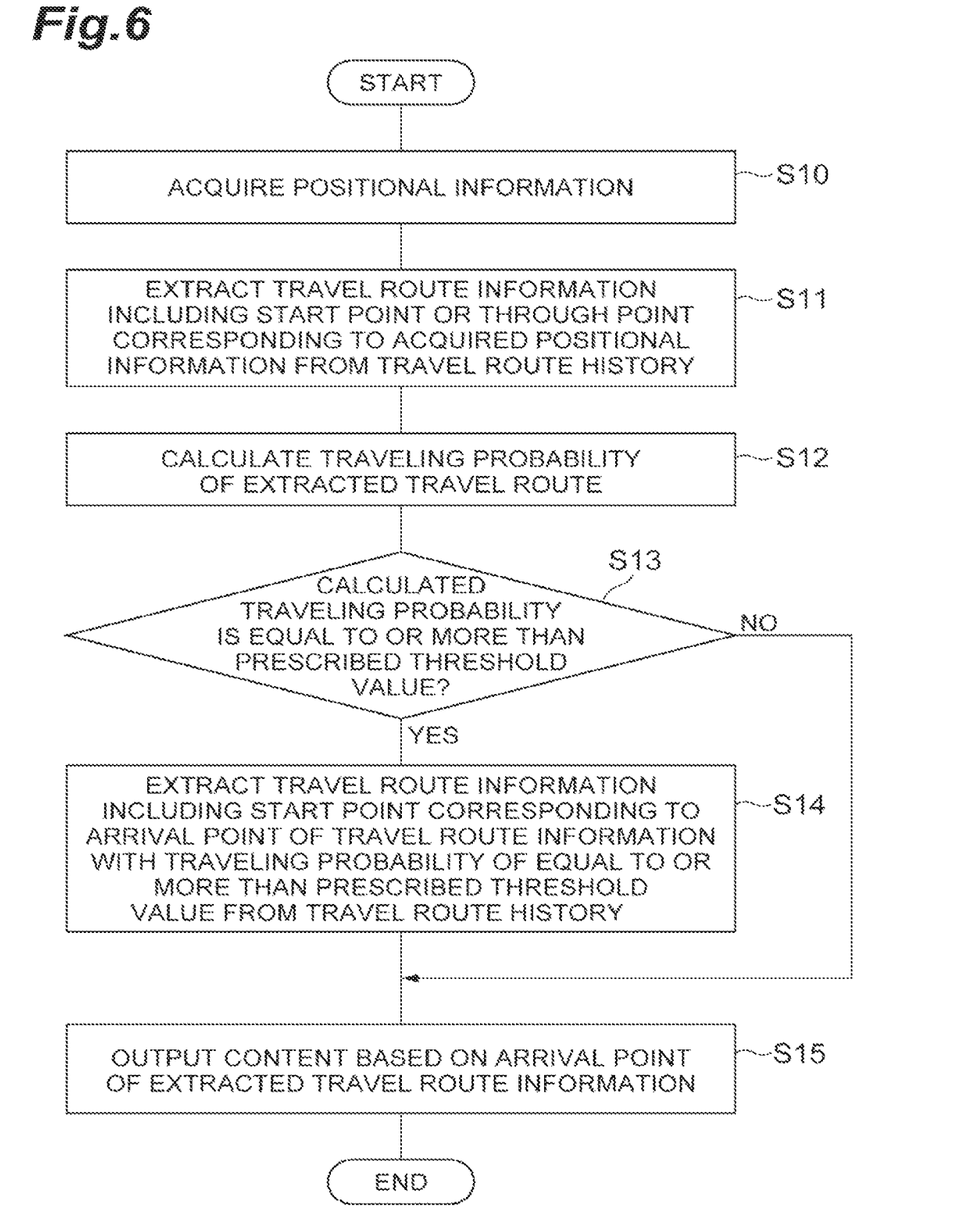
FIG. 6 shows a flowchart showing estimation processing of a destination.

Subsequently, estimation processing of the destination executed by the destination estimation apparatus 1 will be described by using the flowchart shown in FIG. 6.

First, the positional information is acquired by the positional information acquisition unit 10 (step S10). Then, a set or more of travel route information including a start point or a through point corresponding to the positional information acquired in S10 is extracted by the destination estimation unit 15 from the travel route history stored by the travel route history storage unit 14 (step S11). Note that the arrival point included in each set of the travel route information extracted in S11 is the destination of the user estimated in the first time by the destination estimation unit 15. Then, traveling probability (corresponding to the reaching level described above) for traveling the travel route indicated by each set of the travel route information is calculated by the destination estimation unit 15 for each set of the travel route information extracted in S11 (step S12). For example, in S12, the destination estimation unit 15 calculates, as a traveling probability of the travel route indicated by the travel route information, a value acquired by dividing the value in the column of the number of traveling times of the each set of the travel route information by a total value of the values in the column of the number of traveling times of all the sets of the travel route information included in the travel route history stored by the travel route history storage unit 14.

Subsequently to S12, it is judged by the destination estimation unit 15 whether or not the traveling probability calculated in S12 is equal to or more than a prescribed threshold value (90%, for example) (step S13). When judged as being equal to or more than the prescribed threshold value in S13 (S13: YES), the destination estimation unit 15 extracts a set or more of travel route information including start points (included within a prescribed distance from the arrival points, for example) corresponding to each of arrival points of a set or more of travel route information indicating each of one or more of travel route stored judged as being equal to or more than the prescribed threshold value judged in S13 from the travel route history stored by the travel route history storage unit 14 (step S14), and each of the arrival points of a set or more of the extracted travel route information is outputted to the content output unit 16. Note that the arrival point included in each set of the travel route information extracted in S14 is the destination of the user estimated in the second time (re-estimated) by the destination estimation unit 15. In the meantime, when judged as not equal to or more than the prescribed threshold value in S13 (S13: NO), the arrival point of the travel route information extracted in S11 is extracted by the destination estimation unit 15, and the arrival point of the extracted travel route information is outputted to the content output unit 16. Subsequently to S14 and S13: NO, the content based on the inputted arrival point are outputted by the content output unit 16 (step S15). The above processing of S10 to S15 is estimation processing of the destination executed by the destination estimation apparatus 1.

Hereinafter, some modification examples of the present embodiment will be described.

When the reaching level of the estimated destination is equal to or more than the prescribed threshold value, the destination estimation unit 15 calculates a predicted arrival time of the user for the estimated destination based on the positional information of the user acquired by the positional information acquisition unit 10, the acquisition time, and the estimated destination, and may re-estimate a new destination by taking the estimated destination as a start point based on the travel route information including the departure time that is within a prescribed time from the calculated predicted arrival time out of the travel route information configuring the travel route history stored by the travel route history storage unit 14. As a specific calculation example of the predicted arrival time executed by the destination estimation unit 15, a distance between two points is calculated from a difference in the latitudes and longitudes of the positional information of the user acquired by the positional information acquisition unit 10 and the estimated destination, the calculated distance is divided by an average travel speed (4000 m/h, for example) of the user of the mobile terminal 2 set in advance, and the value as a divided result is added to the acquisition time acquired by the positional information acquisition unit 10.

When setting and updating the number of traveling times of the travel route information of the past included in the travel route history stored by the travel route history storage unit 14, the travel route history registration unit 13 may set and update the number of traveling times for each day of the week and/or each time zone in the target travel route. When setting and updating the number of traveling times for each time zone, for example, the number of traveling times is set and updated by dividing the time into four time zones of 0 to 5 o'clock, 5 to 10 o'clock, 10 to 16 o'clock, and 16 to 24 o'clock. Then, the destination estimation unit 15 calculates the traveling probability for each day of the week and/or each time zone set and updated by the travel route history registration unit 13 when calculating the traveling probability, and may judge whether or not the calculated probability for each day of the week and/or each time zone is equal to or more than a prescribed threshold value.

The destination estimation unit 15 may also output the traveling probability (reaching level) of the destination when outputting the estimated arrival point (destination) to the content output unit 16. Then, the content output unit 16 may perform output based on the arrival point and the traveling probability inputted from the destination estimation unit 15. For example, the content output unit 16 may output the content regarding the M-places (M is a prescribed integer) of arrival points with higher traveling probability.

The modification example of the present embodiment has been described heretofore.

The block diagram used for explanations of the present embodiment shows blocks of the functional units. Those functional blocks (constituents) are implemented by an any combination of hardware and/or software. Further, there is no specific limit set on means for achieving each of the functional blocks. That is, each of the functional blocks may be implemented by a single device coupled physically and/or logically or may be implemented by a plurality of devices by directly and/or indirectly (e.g., cable and/or radio) connecting two or more devices separated physically and/or logically.

Figure 7:
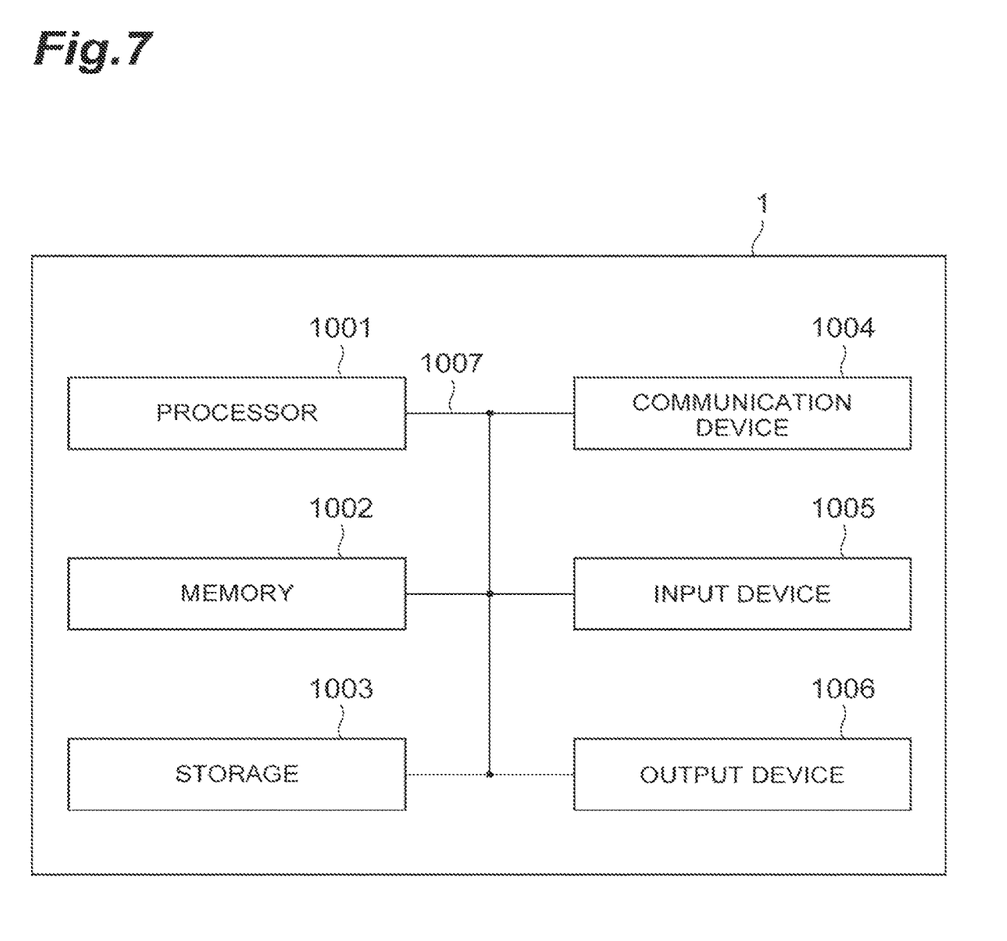
FIG. 7 shows a block diagram for describing a hardware structure of the destination estimation apparatus according to the embodiment of the present invention.

For example, the destination estimation apparatus 1 (and the mobile terminal 2; this applies hereinafter as well) and the like according to an exemplary embodiment of the present invention may function as a computer for executing the processing regarding the destination estimation of the present invention. FIG. 7 is a block diagram showing an example of a hardware structure of the destination estimation apparatus 1 according to the exemplary embodiment of the present invention. The destination estimation apparatus 1 described above may physically be configured as a computer device including a processor 1001, a memory 1002, a storage 1003, a communication device 1004, an input device 1005, an output device 1006, a bus 1007, and the like.

Note that the term "device" can also be taken as a circuit, unit, or the like in the following explanations. The hardware structure of the destination estimation apparatus 1 may be configured to include a single or a plurality of each device shown in the drawings or may be configured without including a part of the devices.

Each of the functions of the destination estimation apparatus 1 is implemented by having prescribed software (program) loaded on hardware such as the processor 1001 and the memory 1002 and performing arithmetic operations by the processor 1001 to control communications by the communication device 1004 and reading and/or writing of data in the memory 1002 and the storage 1003.

The processor 1001 controls the entire computer by operating an operating system, for example. The processor 1001 may be configured with a central processing unit (CPU) including an interface with peripheral devices, a control device, an arithmetic operation device, a register, and the like. For example, the above-described positional information acquisition unit 10, the travel route creation unit 11, the travel route history registration unit 13, the destination estimation unit 15, the content output unit 16 and the like may be implemented by the processor 1001.

Further, the processor 1001 reads out the program (program code), software modules, and data from the storage 1003 and/or the communication device 1004 to the memory 1002, and executes various kinds of processing according to those. As the program, used is a program causing the computer to execute at least a unit of the actions described in the present embodiment. For example, the positional information acquisition unit 10, the travel route creation unit 11, the travel route history registration unit 13, the destination estimation unit 15, and the content output unit 16 may be stored in the memory 1002 and implemented by a control program operated in the processor 1001. Other functional blocks may also be implemented in a similar manner. While each kind of above-described processing is described to be executed by a single processor 1001, such processing may be executed by two or more processors 1001 simultaneously or successively. The processor 1001 may be mounted by one chip or more. Note that the program may be transmitted from the network via a telecommunications line.

The memory 1002 is a computer-readable recording medium, and may be configured with at least one of ROM (Read Only Memory), EPROM (Erasable Programmable ROM), EEPROM (Electrically Erasable Programmable ROM), and RAM (Random Access Memory), for example. The memory 1002 may be called a register, a cache, a main memory (main storage device), or the like. The memory 1002 can save the program (program code), software modules, and the like capable of being executed for performing the processing regarding destination estimation according to an exemplary embodiment of the present invention.

The storage 1003 is a computer-readable recording medium, and may be configured with at least one of an optical disk such as a CD-ROM (Compact Disc ROM), a hard disc drive, a flexible disc, a magneto-optical disc (e.g., a compact disc, a digital multi-use disc, a Blu-ray (registered trademark) disc), a smart card, a flash memory (e.g., a card, a stick, a key drive), a floppy (registered trademark) disc, and a magnetic strip, for example. The storage 1003 may also be called a subsidiary storage device. The above-described recording medium may be a database, a server, and other appropriate medium including the memory 1002 and/or the storage 1003, for example.

The communication device 1004 is hardware (transmission and reception device) for enabling communications between computers via a cable and/or radio network, and may also be called a network device, a network controller, a network card, or a communication module, for example. The positional information acquisition unit 10 and the content output unit 16, for example, may be implemented by the communication device 1004.

The input device 1005 is an input device (e.g., a keyboard, a mouse, a microphone, a switch, a button, or a sensor) accepting input from outside. The output device 1006 is an output device (e.g., a display, a speaker, or an LED lamp) performing output for outside. Note that the input device 1005 and the output device 1006 may be an integrated structure (e.g., a touch panel).

Further, each of the devices such as the processor 1001 and the memory 1002 are connected via the bus 1007 for communicating information. The bus 1007 may be configured with a single bus or may be configured with different buses between the devices.

Further, the destination estimation apparatus 1 may be configured by including hardware such as a microprocessor, a digital signal processor (DSP), ASIC (Application Specific Integrated Circuit), PLD (Programmable Logic Device), FPGA (Field Programmable Gate Array), and the like, and a part of or all of each of the functional blocks may be implemented by the hardware. For example, the processor 1001 may be mounted at least one piece of such hardware.

Next, working effects of the destination estimation apparatus 1 configured as in the present embodiment will be described.

With the destination estimation apparatus 1 of the present embodiment, when the traveling probability (reaching level) of the estimated arrival point (destination) is calculated by the destination estimation unit 15 and the calculated traveling probability is equal to or more than a prescribed threshold value, a new arrival point taking the estimated arrival point as a start point is re-estimated. For example, in a case where the user's home is estimated as the arrival point when the user is going home at night and the traveling probability to the user's home is equal to or more than a prescribed threshold value, a new arrival point taking the user's home as the start point is re-estimated. The re-estimated new arrival point is useful for the user since the new arrival point can be a candidate for the destination the user goes the next day, for example. That is, it is possible to estimate the destination more useful for the user.

Further, with the destination estimation apparatus 1 of the present embodiment, in a case where the traveling probability of the estimated arrival point is equal to or more than the prescribed threshold value, the predicted arrival time of the user for the estimated arrival point is calculated, and a new arrival point taking the estimated arrival point as the start point is re-estimated based on the travel route information including the departure time that is within a prescribed time from the calculated predicted arrival time out of the travel route information included in the travel route history stored by the travel route history storage unit 14. Thereby, for example, the arrival point is estimated based on the travel route of the past departed within a prescribed time after arriving at the arrival point estimated in the first time, so that it is possible to estimate a more useful destination in accordance with the past records of the user.

Further, with the destination estimation apparatus 1 of the present embodiment, the traveling probability of each day of the week and/or each time zone (at least each day of the week or each time zone) is calculated when calculating the traveling probability. Then, in a case where the calculated traveling probability of each day of the week and/or each time zone (at least each day of the week or each time zone) is equal to or more than a prescribed threshold value, a new arrival point taking the estimated arrival point as the start point is re-estimated. This enables estimation of the destination by adding the day of the week and/or time zone (at least the day of the week or the time zone), so that it is possible to estimate a more useful destination for the user.

While the present embodiment has been described above in detail, it would be obvious to those skilled in the art that the present embodiment is not limited to the embodiment described in the present description. The present invention can be implemented as modifications and in different aspects without departing from the spirit and scope of the present invention as defined by the scope of the appended claims. Accordingly, the description in the present description is for the purpose of illustrative explanations, and does not have any restrictive meaning for the present embodiment.

Notification of the information is not limited to the aspect/embodiment described in the present description but may be executed by other methods.

Each aspect/embodiment described in the present description may be applied to systems utilizing LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other suitable systems and/or to next-generation systems expanded based on those.

The orders of the processing, sequences, flowcharts, and the like of each aspect/embodiment described in the present description may be changed as long as there is no conflic­tion. For example, the method described in the present description presents elements of various steps in illustrative orders and not intended to be limited to the presented specific orders.

Inputted and outputted information and the like may be saved in a specific place (e.g., a memory) or may be managed in a management table. The inputted and outputted information and the like can be overwritten, updated, or have postscripts added thereon. The outputted information and the like may be deleted. The inputted information and the like may be transmitted to other devices.

Judging may be done according to values (0 or 1) expressed by 1 bit, done according to Boolean (true or false), or done by comparison of numerical values (e.g., compari­son with a prescribed value).

Each aspect/embodiment described in the present descrip­tion may be used alone, in combination, or switched in accordance with execution. Further, a notification of pre­scribed information (e.g., a notification of "being X") is not limited to be done explicitly but may be done implicitly (e.g., not doing notification of the prescribed information).

While the present invention has been described above in detail, it would be obvious to those skilled in the art that the present invention is not limited to the embodiment described in the present description. The present invention can be implemented as modifications and in different modes with­out departing from the spirit and scope of the present invention as defined by the scope of the appended claims. Accordingly, the description in the present description is for the purpose of illustrative explanations, and does not have any restrictive meaning for the present invention.

Regardless of how it is called such as software, firmware, middleware, microcode, hardware description language, or the like, it is to be noted that the software is to be interpreted broadly as instructions, instruction sets, codes, code seg­ments, program codes, programs, sub-programs, software modules, application, software application, software pack­ages, routines, sub-routines, objects, executable files, execu­tion threads, procedures, functions, and the like.

Further, the software, instructions, and the like may be transmitted and received via a transmission medium. For example, when the software is transmitted from a website, a server, or another remote source by using a cable technique such as a coaxial cable, optical fiber cable, twist pair, or digital subscriber line (DSL) and/or a radio technique such as infrared, radio, microwave, or the like, such cable tech­niques and/or radio techniques are included within a defi­nition of the transmission medium.

The information, signals, and the like described in the present description may be expressed by using one of various different techniques. For example, data, instructions, commands, information, signals, bits, symbols, chips, and the like, which may be referred to through the whole explanations above, may be expressed by voltage, electric current, magnetic field or magnetic particle, photo field or photon, or any combination of those.

Note that the terms described in the present description and/or the terms necessary for understanding the present description may be replaced with terms having the same or similar meaning.

The terms "system" and "network" used in the present description are used interchangeably.

Further, the information, parameters, and the like described in the present description may be expressed by absolute values, relative values with respect to a prescribed value, or another corresponding information.

The names used for the above-described parameters are not restrictive in any respect. Further, formulae and the like using those parameters may be different in some cases from those explicitly disclosed in the present Disclosure.

The term "determining" used in the present description may include various types of operations. For example, "determining" may include considering that judging, calcu­lating, computing, processing, deriving, investigating, look­ing up (e.g., looking up in a table, a database or another data structure), ascertaining, and the like are "determined". Also, "determining" may include considering that receiving (e.g., receiving information), transmitting (e.g., transmitting infor­mation), inputting, outputting, accessing (e.g., accessing data in a memory), and the like are determined. Also, "determining" may include considering that resolving, selecting, choosing, establishing, comparing, and the like are "determined". That is, "determining" may include regarding that some operations are "determined".

The terms "connected" and "coupled" or various modifications of those indicate direct or indirect connection or coupling between two or more elements, and may include a situation having one or more intermediate element existing between the two elements "connected" or "coupled" to each other. Coupling or connection between the elements may be physical, logical, or a combination of those. When used in the present description, the two elements are considered to be "connected" and "coupled" to each other by using one or more electric wire, cable and/or print electrical connection or by using electromagnetic energy such as electromagnetic energy having wavelengths of radio frequency domain, microwave domain, and light (both visible and invisible) domains as examples of some of nonrestrictive and exclusive examples.

"Based on" used in the present description does not mean "based only on" unless expressly stated otherwise. In other words, "based on" means both "based only on" and "based at least on".

The terms "include", "including", and modifications of those are intended to be inclusive like the term "comprise" used as long as used in the present description or the scope of the appended claims. Further, the term "or" used in the present description or the scope of the appended claims is intended not to be an exclusive OR.

When articles such as a, an, and the in English are added in the process of translation in the entire present disclosure, those articles are intended to include a plurality of items unless explicitly stated in the context otherwise.

REFERENCE SIGNS LIST

1 Destination Estimation Apparatus
2 Mobile Terminal
3 Destination Estimation System
10 Positional Information Acquisition Unit
11 Travel Route Creation Unit
12 Travel Route Storage Unit
13 Travel Route History Registration Unit
14 Travel Route History Storage Unit
15 Destination Estimation Unit
16 Content Output Unit
20 Positional Information Transmission Unit
21 Content Output Unit

The invention claimed is:

1. A destination estimation apparatus, comprising:
memory storing a positional information history as a history of positional information of a user; and
a circuitry configured to:
acquire the positional information of the user; and
estimate, based on the positional information history stored by the memory, a destination of the user by taking a location indicated by the acquired positional information as a start point, wherein
the circuitry further configured to calculate a reaching level as a degree the user is reaching an estimated destination based on the positional information history stored by the memory, and re-estimate a new destination by taking the estimated destination as a start point when a calculated reaching level is equal to or more than a prescribed threshold value.

2. The destination estimation apparatus according to claim 1, wherein:
the positional information history is configured with travel route information comprising positional information of the start point, departure time of the start point, and positional information of an arrival point; and
the circuitry further configured to:
acquire acquisition time at which the positional information is acquired along with acquisition of the positional information of the user; and
when the reaching level of the estimated destination is equal to or more than the prescribed threshold value, calculate a predicted arrival time of the user at the estimated destination based on the acquired positional information of the user, the acquired acquisition time and the estimated destination, and re-estimate a new destination by taking the estimated destination as a start point based on the travel route information comprising the departure time that is within a prescribed time from the calculated predicted arrival time out of the travel route information configuring the positional information history stored by the memory.

3. The destination estimation apparatus according to claim 2, wherein:
the positional information history is configured with travel route information indicating a route the user travelled, the travel route information comprising a number of traveling times of the route at least by each day of the week or each time zone; and
the circuitry further configured to, when calculating the reaching level, calculate the reaching level at least by each day of the week or each time zone based on the number of traveling times at least by each day of the week or each time zone comprised in the travel route information configuring the positional information history stored by the memory.

4. The destination estimation apparatus according to claim 1, wherein:
the positional information history is configured with travel route information indicating a route the user travelled, the travel route information comprising a number of traveling times of the route at least by each day of the week or each time zone; and
the circuitry further configured to, when calculating the reaching level, calculate the reaching level at least by each day of the week or each time zone based on the number of traveling times at least by each day of the week or each time zone comprised in the travel route information configuring the positional information history stored by the memory.

* * * * *